US008325790B2

(12) United States Patent
Primo et al.

(10) Patent No.: US 8,325,790 B2
(45) Date of Patent: Dec. 4, 2012

(54) EQUALIZATION FOR OFDM COMMUNICATION

(75) Inventors: Haim Primo, Gane Tikwa (IL); Yosef Stein, Sharon, MA (US); Wei An, Newton, MA (US)

(73) Assignee: Analog Devices, Inc., Norwood, MA (US)

( * ) Notice: Subject to any disclaimer, the term of this patent is extended or adjusted under 35 U.S.C. 154(b) by 619 days.

(21) Appl. No.: 12/534,359

(22) Filed: Aug. 3, 2009

(65) Prior Publication Data

US 2011/0026577 A1 Feb. 3, 2011

(51) Int. Cl.
*H03H 7/00* (2006.01)
*H04J 11/00* (2006.01)

(52) U.S. Cl. ........................................ 375/232; 370/210

(58) Field of Classification Search .................. 375/229, 375/230, 232, 316, 340, 346, 348, 349, 285, 375/259; 370/203, 208, 210

See application file for complete search history.

(56) References Cited

U.S. PATENT DOCUMENTS

| | | | |
|---|---|---|---|
| 5,363,412 A | 11/1994 | Love et al. | |
| 5,502,507 A * | 3/1996 | Kim | 348/607 |
| 6,556,639 B1 | 4/2003 | Goldston et al. | |
| 6,954,421 B2 | 10/2005 | Kuwabara et al. | |
| 7,440,506 B2 | 10/2008 | Atungsiri et al. | |
| 7,583,755 B2 | 9/2009 | Ma et al. | |
| 7,668,269 B2 | 2/2010 | Ma et al. | |
| 7,830,994 B2 | 11/2010 | Primo et al. | |
| 2002/0097669 A1 | 7/2002 | Kim | |
| 2005/0111538 A1 * | 5/2005 | Wernaers | 375/229 |
| 2005/0163258 A1 | 7/2005 | Gore et al. | |
| 2005/0213679 A1 | 9/2005 | Yamagata | |
| 2006/0159188 A1 | 7/2006 | Izumi | |
| 2006/0176802 A1 * | 8/2006 | Ko et al. | 370/208 |
| 2006/0188034 A1 | 8/2006 | Sampath | |
| 2006/0222099 A1 | 10/2006 | Varadarajan et al. | |
| 2007/0036232 A1 | 2/2007 | Hayashi | |
| 2007/0242761 A1 * | 10/2007 | Yang | 375/260 |
| 2008/0095256 A1 | 4/2008 | Primo et al. | |
| 2008/0095275 A1 | 4/2008 | Primo et al. | |
| 2008/0112386 A1 | 5/2008 | Ogawa et al. | |
| 2008/0192850 A1 | 8/2008 | Mitsugi | |

FOREIGN PATENT DOCUMENTS

EP 1531590 5/2005

OTHER PUBLICATIONS

International Search Report dated Apr. 2, 2008 for Application No. PCT/US07/22129, 6 pages.
International Preliminary Report on Patentability mailed Apr. 22, 2009 for International Application No. PCT/US2007/022129 (6 pages).
International Search Report & Written Opinion mailed Jan. 25, 2011 for International Application No. PCT/US2010/044098 (11 pages).

* cited by examiner

*Primary Examiner* — David C. Payne
*Assistant Examiner* — Vineeta Panwalkar
(74) *Attorney, Agent, or Firm* — Bingham McCutchen LLP

(57) ABSTRACT

The problem of inefficient channel impulse-response processing is addressed by processing different parts of a channel impulse response to accurately locate channel taps, and to generate more than one set of equalization coefficients. This allows the most-suited equalization coefficient to be selected based on a selection criterion.

12 Claims, 9 Drawing Sheets

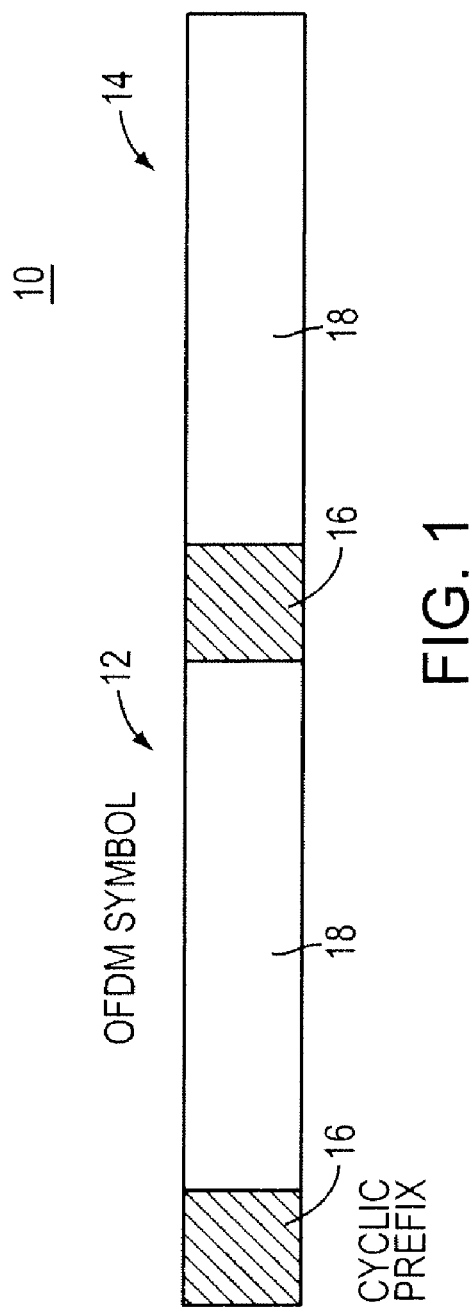
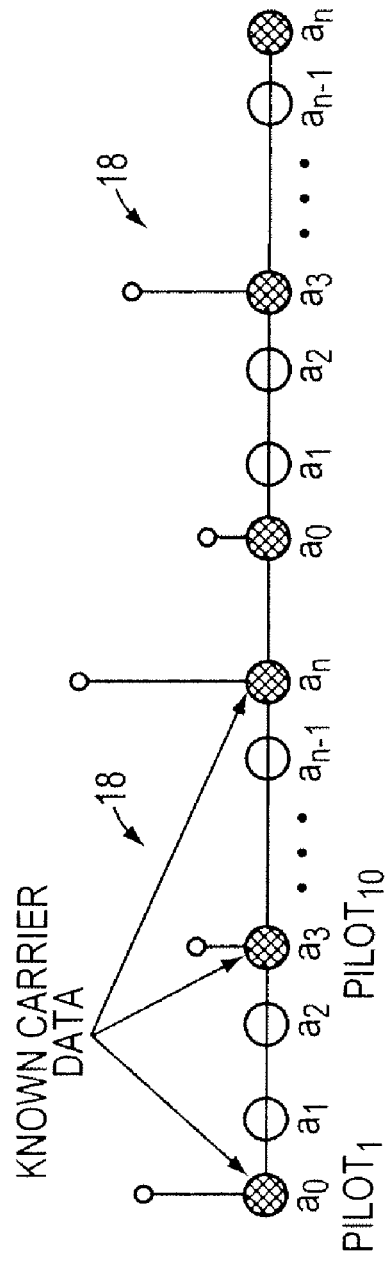

FREQUENCY RESPONSE VECTOR $$[H_0 \ 0 \ 0 \ 0 \ H_4 \ 0 \ 0 \ 0 \ \ldots \ 0 \ 0 \ H_{520} \ 0 \ 0 \ 0 \ \ldots]$$

PILOT SUB-CARRIERS

OF SUB-CARRIERS 1024

FIG. 5

EQUALIZATION FOR OFDM COMMUNICATION

FIELD OF THE INVENTION

The present invention relates to equalizers used in wireless communication receivers, e.g., orthogonal frequency-division multiplexing (OFDM) receivers.

BACKGROUND

In wireless systems, such as digital mobile television systems, wireless local area networks, and wireless asynchronous-transfer-mode (ATM) systems, data signals are superimposed onto a reference carrier signal through signal modulation. Typically, depending upon the mobility and location of the transmitter and receiver, the signal may follow multiple paths from transmitter to receiver. Due to this "multipath" environment, the receiver may receive multiple copies of the transmitted signal with different transmission delays and different attenuations. As a result, the received signal may suffer interference known as inter-symbol interference (ISI), which limits the channel capacity of a wireless system.

One way of overcoming the ISI is through use of OFDM, which utilizes a plurality of sub-carriers. In an OFDM-based system, a serial data stream is converted into a plurality of parallel data symbols. Each data symbol modulates one of the sub-carriers using a conventional modulation technique, such as binary-phase shift keying (BPSK), and quadrature amplitude modulation (QAM), etc. All of the parallel, modulated sub-carriers are then combined to form an OFDM symbol, and a serial stream of such OFDM symbols is transmitted using an RF carrier signal. A guard interval, or a prefix, of a particular width (typically, a fraction of the OFDM symbol size) may be introduced in the OFDM symbols. The width of a guard interval is chosen such that the overlap (in the time domain) of the OFDM symbols—and, therefore, the ISI—must occur within the guard interval. When the receiver receives the OFDM symbols, the guard interval is removed before the useful data is processed, thereby reducing the effect of ISI. However, a guard interval increases the overall OFDM symbol period, and thus negatively affects the overall bandwidth of an OFDM system.

The sub-carriers in an OFDM system are orthogonal to one another, i.e., they are spaced apart so that an orthogonality exists between every two sub-carriers. Accordingly, in theory, any cross-talk between two sub-carriers (known as inter-carrier interference, or "ICI") is eliminated. However, the presence of a guard interval in an OFDM symbol, and other amplitude and/or phase distortions caused by, e.g., carrier frequency offset, cause loss of orthogonality between sub-carriers, and as a result, ICI is not eliminated. A conventional solution to this problem is to use a cyclic extension (or a cyclic prefix) of the OFDM symbol as the guard interval to preserve the orthogonality. However, as mentioned above, a guard interval may still reduce the overall bandwidth of an OFDM system.

Another way to eliminate ISI and ICI is to use an equalizer that modifies the amplitude and/or phase of the received data adaptively, for example, by multiplying the received data with a coefficient that includes an amplitude-compensation factor and/or a phase-compensation factor.

Typically, equalization coefficients are determined from the frequency response of the channel, which in turn is related to the channel impulse response. Conventional equalizers process only a specific portion of the channel impulse response to determine the gains of multiple channel paths (generally known as channel taps), which may not completely eliminate noise in the impulse-response data. Such limited processing may result in inaccurate channel frequency response, and therefore erroneous equalization coefficients.

SUMMARY

In accordance with embodiments of the present invention, the problem of inefficient channel impulse-response processing is addressed by processing different parts of a channel impulse response to accurately locate channel taps and to generate more than one set of equalization coefficients. This allows the most-suited equalization coefficient to be selected based on a selection criterion.

In broad overview, systems and methods in accordance with the invention may be implemented in connection with wireless communication receivers, e.g., OFDM receiver of a mobile TV network, such as DVB-H, MediaFLO, ISDB-T, etc. In one embodiment of the invention, a channel impulse-response vector of a received OFDM symbol is processed to obtain a coarse mask vector and a fine mask vector. A coarse equalization coefficient vector and a fine equalization coefficient vector may be calculated based on the coarse mask vector and the fine mask vector, respectively. In one embodiment, equalization on the received OFDM symbol is performed using the coarse and fine equalization coefficient vectors to obtain a coarse equalized data vector and a fine equalized data vector. One of the coarse equalization coefficient vector and the fine equalization coefficient vector may be selected based on one or more selection criteria. In one embodiment, a selection criterion determines which of a coarse difference and a fine difference is smaller. The coarse difference may be the difference between the coarse equalized data vector and an actual data vector of the OFDM symbol, and the fine difference may be the difference between the fine equalized data vector and the actual data vector. At least one of the differences may be calculated as a mean square error (MSE).

Accordingly, in one aspect, the invention comprises a system for determining equalization coefficients for an OFDM symbol stream. The system includes a channel-processing module, a coefficient module, and a selection module. The channel-processing module processes a channel impulse-response vector of a received OFDM symbol to generate a coarse mask vector and a fine mask vector. The coefficient module calculates a coarse equalization coefficient vector based on the coarse mask vector and a fine equalization coefficient vector based on the fine mask vector. The selection module selects the coarse equalization coefficient module or the fine equalization coefficient module based on one or more selection criteria. In various embodiments, a selection criterion is which of a coarse difference and a fine difference is smaller. The system may further comprise an equalization module to perform equalization on an OFDM symbol using the coarse and fine equalization coefficient vectors to obtain coarse and fine equalized data vectors. In this embodiment, the coarse difference is between the coarse equalized data vector and an actual data vector of the OFDM symbol, and the fine difference is between the fine equalized data vector and the actual data vector. At least one of the differences may be calculated as a mean square error.

In one embodiment, the system further comprises a receiving module to receive an OFDM symbol and remove a cyclic prefix from the OFDM symbol. The system may further comprise a Fourier-transform module to perform Fourier transform on an OFDM symbol. In another embodiment, the system further comprises a pilot-extraction module to extract data of known sub-carriers of an OFDM symbol. The pilot-extraction module may include an index store module to store indices of the known sub-carriers, and a read module to read data at the stored indices. In yet another embodiment, the system further comprises a normalization module to normalize data of known sub-carriers of an OFDM symbol using known data and equating data of unknown sub-carriers of the OFDM symbol to zero to generate a frequency-response vector. The system may further comprise an inverse Fourier-transform module and a noise-estimation module. The inverse Fourier-transform module performs inverse Fourier transform on a frequency-response vector to obtain the channel impulse-response vector which is used by the channel-processing module. The noise-estimation module determines channel noise level. In one embodiment, the calculation of the coarse equalization coefficient vector and the fine equalization coefficient vector in the coefficient module is further based on the channel noise level.

In various embodiments of the invention, the channel-processing module includes a threshold module, a window module, a movement module, a null module, and a transform module. The threshold module identifies non-zero values in the channel impulse-response vector which are at least equal to a threshold. In one embodiment, the threshold module includes an averaging module to calculate the average of the values in the channel impulse-response vector. The threshold may be at least based on the calculated average. The window module defines a coarse set of non-overlapping windows covering the identified non-zero values in the channel impulse-response vector; each window may include at least one identified non-zero value. The movement module moves a coarse set window within a predetermined range to obtain a fine set of non-overlapping windows. The null module equates values in the channel impulse-response vector which are excluded in the coarse window set to zero to obtain a coarse window vector, and equates values in the channel impulse-response vector which are excluded in the fine window set to zero to obtain a fine window vector. The transform module transforms the coarse window vector and the fine window vector to generate the coarse mask vector and the fine mask vector. In one embodiment, the transform module includes a Fourier-transform module to perform Fourier transform on the coarse and fine window vectors.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 1 depicts a time-domain representation of two OFDM symbols;

FIG. 2 depicts a frequency-domain representation of the OFDM symbols of FIG. 1;

FIG. 5 illustrates an exemplary frequency-response vector;

DESCRIPTION OF THE INVENTION

Figure 3:
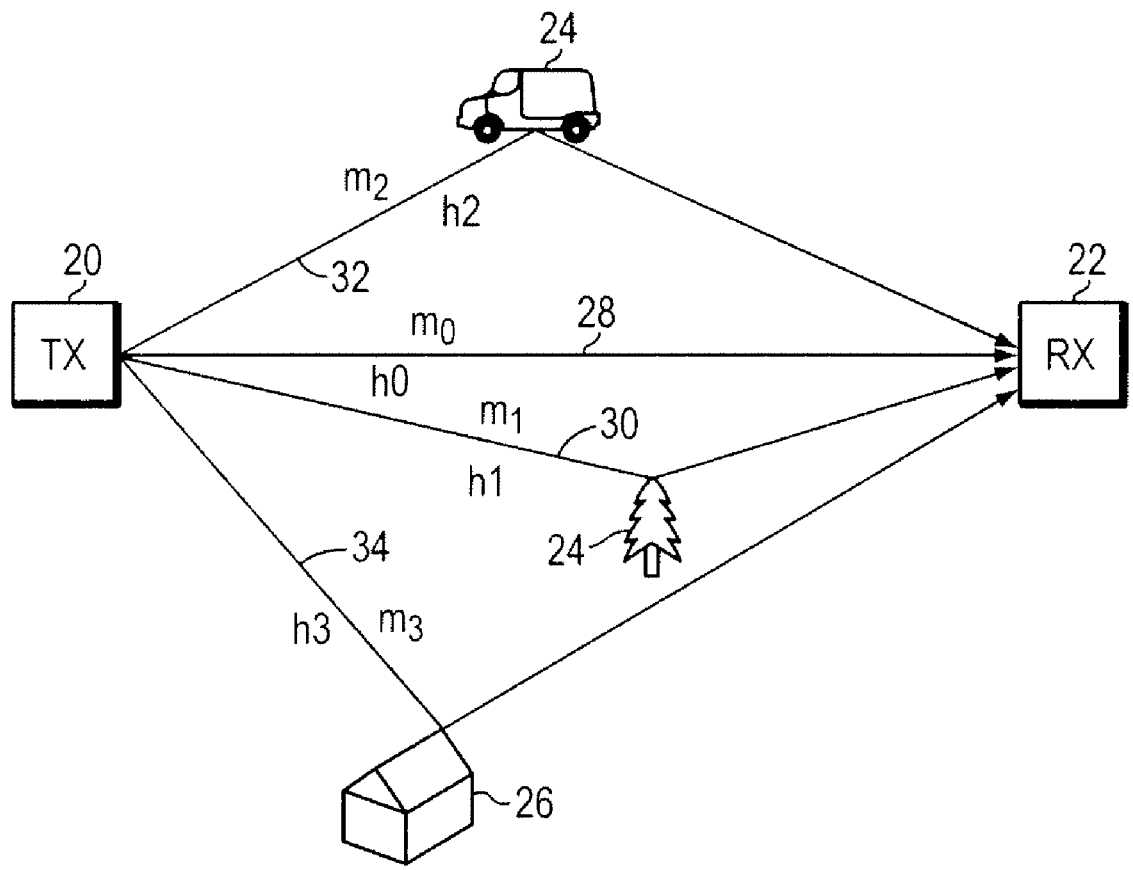
FIG. 3 illustrates an example of multiple paths occurring in a channel between a transmitter and receiver.

Referring to FIG. 1, an OFDM symbol stream 10 includes two OFDM symbols 12 and 14, each of which includes a cyclical prefix section 16 and sub-carrier data section 18. FIG. 2 illustrates each sub-carrier data section 18 including a plurality of sub-carrier data $a_0, a_1, a_2, a_3 \ldots a_{n-1}, a_n$ where the filled circles represent data carried by reference sub-carriers (generally known as "pilot" sub-carriers), and the empty circles represent data carried by the other sub-carriers. Typically, pilot sub-carrier data, i.e., amplitude and phase, are stored at the receiver for various purposes, such as supervision, control, equalization, and synchronization. FIG. 3 depicts a typical wireless propagation of such an OFDM symbol stream from a transmitter 20 to a receiver 22. Because of reflection from objects 24 in the area and/or if the transmitter 20 and receiver 22 move relatively fast with respect to one another, the channel carrying the OFDM symbol stream may include multiple paths, e.g., the most direct path 28 and additional paths 30, 32, 34. As depicted in FIG. 3, each path may have associated with it a gain or attenuation ($h_0, h_1, h_2$, or $h_3$) and a phase shift ($m_0, m_1, m_2$, or $m_3$). Accordingly, multiple replicas, with different attenuations and different phase shifts, of an OFDM symbol are received at the receiver 22, which may result in the loss of the orthogonality of the sub-carriers and generation of ICI noise in the received OFDM symbol. The ICI noise in the OFDM symbol may, in turn, result in erroneous decoding of the OFDM symbol.

Figure 4:
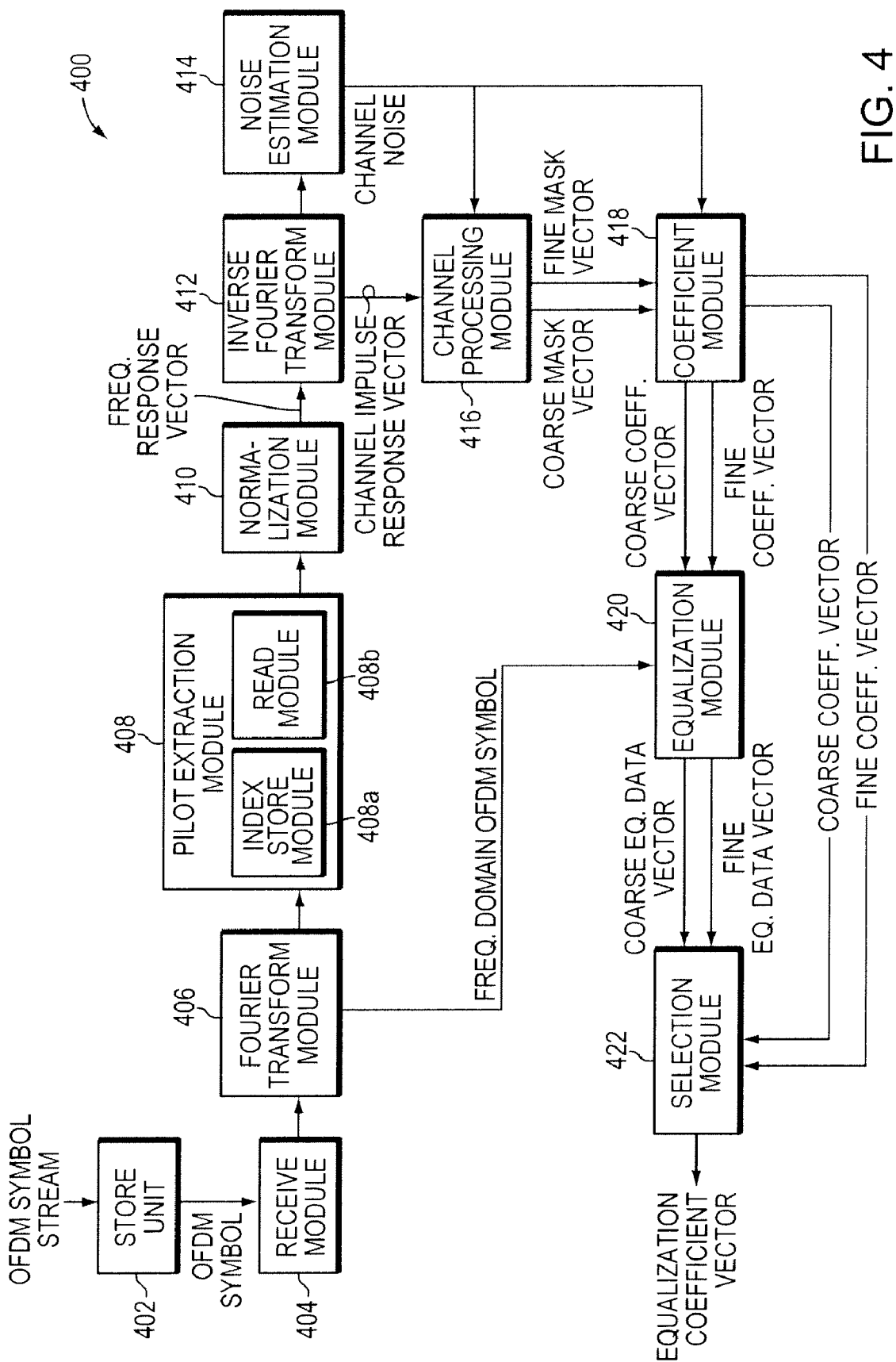
FIG. 4 is a block diagram of a system according to an illustrative embodiment of the invention.

FIG. 4 depicts an illustrative embodiment of the invention in the form of a system 400, which determines equalization coefficients to eliminate ICI in an OFDM symbol stream. The illustrated system 400 includes a store module 402, a receive module 404, a Fourier-transform module 406, a pilot-extraction module 408, a normalization module 410, an inverse Fourier-transform module 412, a noise-estimation module 414, a channel-processing module 416, a coefficient module 418, an equalization module 420, and a selection module 422. The operation and construction of these components according to various embodiments of the invention are described in detail below.

In one embodiment, the system 400 is realized in one or more programmable devices such as a digital signal processor (DSP), or software stored on an article of manufacture (e.g., floppy disks, CDs, hard disks, flash drives, etc.) to enable a general-purpose processor to perform the specific functions described herein, or combination of hardware and software. The system 400 may be integrated with other components (not shown in FIG. 4) of, for example, a digital baseband processor at the receive side of an OFDM communication system. It must be understood that so long as the system performs all necessary functions, it is immaterial how they are distributed within the system and the programming or hardware architecture thereof.

In one embodiment, the store module 402 acts as a buffer for an incoming OFDM symbol stream, and provides one OFDM symbol at a time at its output. The receive module 404 reads an OFDM symbol received from the store module 402, and processes the OFDM symbol to remove any cyclic prefix present therein. The processed OFDM symbol from the receive module 404 may be in serial form, and may therefore be converted into parallel form before being provided to the input of the Fourier-transform module 406. The Fourier-transform module 406 performs a Fourier transform on the OFDM symbols to convert the time-domain OFDM symbols into frequency-domain OFDM symbols in order to obtain a frequency spectrum of the sub-carriers. The Fourier coefficients of the sub-carriers thus generated correspond to the data symbols of the received OFDM symbol (which are to be equalized and eventually decoded). Fourier transform and inverse Fourier transform (as discussed below) performed on OFDM symbols in the system 400 may be any form of discrete Fourier transform (DFT), e.g., fast Fourier transform (FFT) and inverse fast Fourier transform (IFFT).

The frequency-domain OFDM symbol is fed to the input of the pilot-extraction module 408, which detects the received data of the pilot sub-carriers, such as data of the sub-carriers indicated by the filled circles in FIG. 2. In one embodiment, the pilot-extraction module 408 includes an index store module 408a and a read module 408b. Each of the known pilot sub-carriers is associated with an index that indicates its location in the sub-carrier group of an OFDM symbol, and the index store module 408a stores the indices. The read module 408b gathers the received sub-carrier data at the stored indices for presentation to the normalization module 410.

As discussed above, the original transmitted data of the pilot sub-carriers are known at the receiver, and are typically used to estimate the frequency response of the channel. In one embodiment, the known pilot data are stored in or by the normalization module 410. The extracted pilot sub-carrier data are provided at the input of the normalization module 410, which uses the known pilot sub-carrier data to determine the frequency response of the pilot sub-carriers. For example, the frequency-domain OFDM data $Y_k$ of sub-carrier k may be represented as $$Y_k = a_k H_k + n_k$$

where $a_k$ is the known data, $H_k$ is the frequency response, and $n_k$ is the additive noise for sub-carrier k. Accordingly, in one embodiment, an estimate of the frequency response $H_k$ is determined by normalizing $Y_k$ using $a_k$, i.e., $$H_k \approx Y_k/a_k$$

For other sub-carriers of the OFDM symbol, the frequency response is assumed to be equal to zero. Accordingly, a frequency-response vector is generated, which includes the estimated frequency response values at the indices corresponding to the pilot sub-carriers, and zeros otherwise. An exemplary frequency-response vector is shown in FIG. 5, in which $H_0$, $H_4$, $H_{520}$ indicate estimated frequency response values for pilot sub-carriers 0, 4, and 520 in a group of 1024 sub-carriers of the received OFDM symbol. In one embodiment, the normalization module 410 iteratively generates frequency-response vectors for a finite group of OFDM symbols, and then calculates mean of individual elements of the frequency-response vectors to output an average channel frequency-response vector. In another embodiment, the normalization module 410 uses a least squares (LS) method to analyze frequency-response vectors for a group of OFDM symbols to generate a best-fit frequency-response vector that will be used by other system modules.

Figure 6:
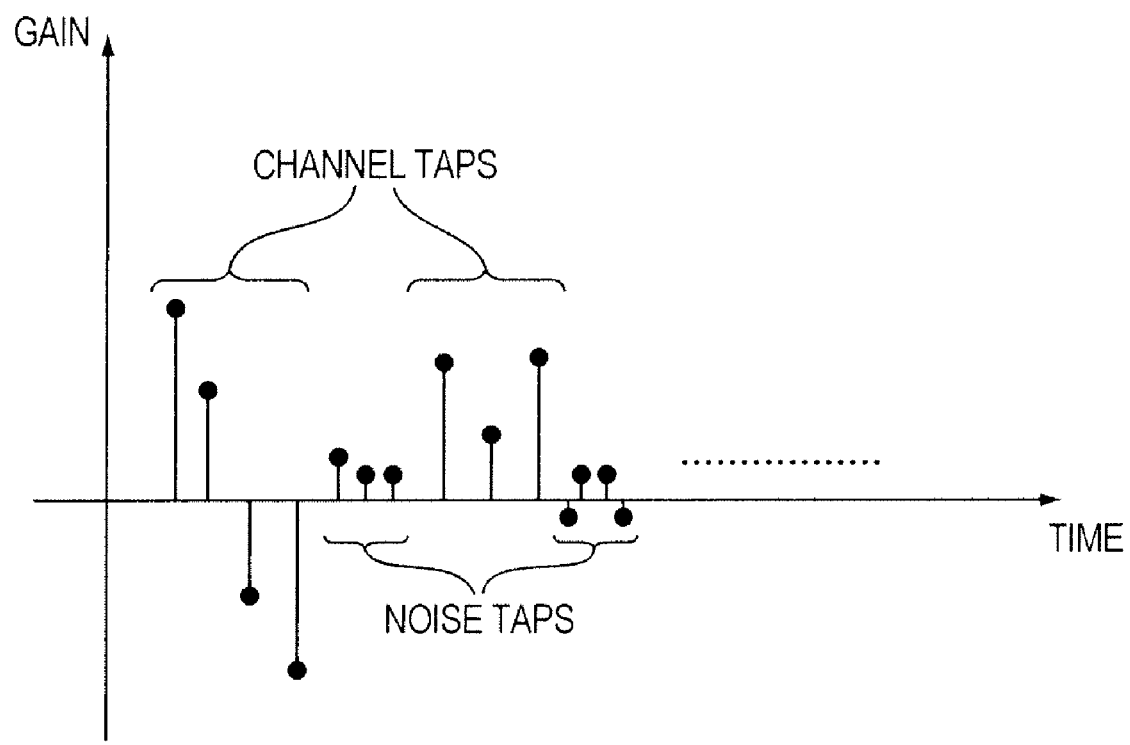
FIG. 6 depicts a gain-versus-time plot for an exemplary channel impulse-response vector.

The inverse Fourier-transform module 412 applies inverse an Fourier transform (typically, IFFT) to the frequency-response vector provided by the normalization module 410 in order to obtain a time-domain channel impulse-response vector. The channel impulse-response vector may include channel gain values (or channel taps) of all the paths in the transmission channel, and unwanted channel noise values (or noise taps). For example, FIG. 6 shows values in an exemplary channel impulse-response vector using a gain-versus-time plot, which indicates channel taps and noise taps. In one embodiment, the channel impulse-response vector is provided to both the noise-estimation module 414 and the channel-processing module 416. The noise-estimation module 414 processes (e.g., calculates an average of) the values in the channel impulse-response vector to determine an estimate of the additive channel noise, e.g., additive white Gaussian noise (AWGN), which may be used in calculating equalization coefficients. The channel-processing module 416 processes, as described in detail below, the channel impulse-response vector to eliminate any noise values therein, and to locate channel taps (or groups thereof) dispersed in the channel impulse-response vector, to ultimately generate a coarse mask vector and a fine mask vector.

Figure 7:
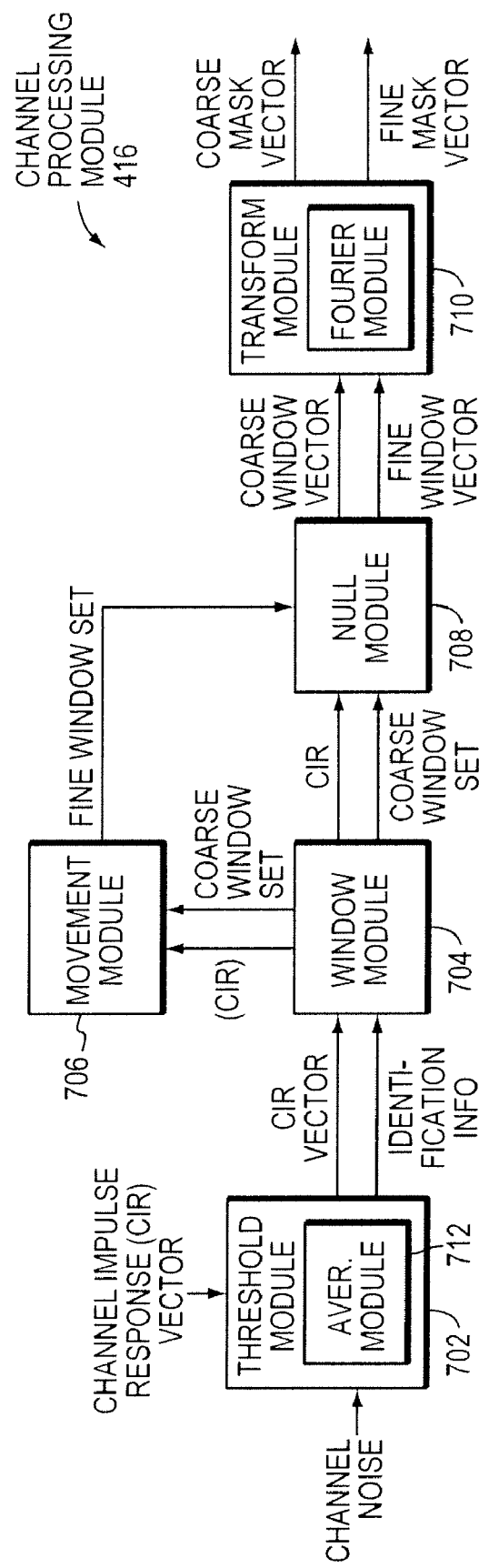
FIG. 7 depicts a block diagram of a channel-processing module of the system depicted in FIG. 4.

FIG. 7 an embodiment of the channel-processing module 416 in greater detail. In this embodiment, the channel-processing module 416 includes a threshold module 702, a window module 704, a movement module 706, a null module 708, and a transform module 710. The threshold module 702 receives at its input the channel impulse-response vector, e.g., from the inverse Fourier-transform module 412, and may also receive the channel noise estimate, e.g., from the noise-estimation module 414. The threshold module 702 examines the impulse-response vector to identify non-zero values therein, and determines which of the non-zero values are equal to or greater than a threshold. The identified non-zero values may represent the channel taps in the impulse-response vector. In one embodiment, the threshold is predetermined and supplied to the threshold module 702. In another embodiment, the threshold module 702 includes an averaging module 712 to calculate the mean of all the values in the channel impulse-response vector, and the threshold is directly related to the calculated mean value, e.g., the threshold may be some multiple of the mean value. In some embodiments, the threshold module 702 uses more than one threshold to identify non-zero values of interest. The threshold module 702 may utilize a power-delay profile which indicates the intensity of a signal (i.e., an OFDM symbol in this case) received through a multipath channel as a function of time delay. The signal intensity, in turn, may indicate the locations of non-zero values of interest in the impulse-response vector. Such indications may reduce the number of comparisons between a vector value and the threshold that the threshold module 702 must perform.

Figure 8A:
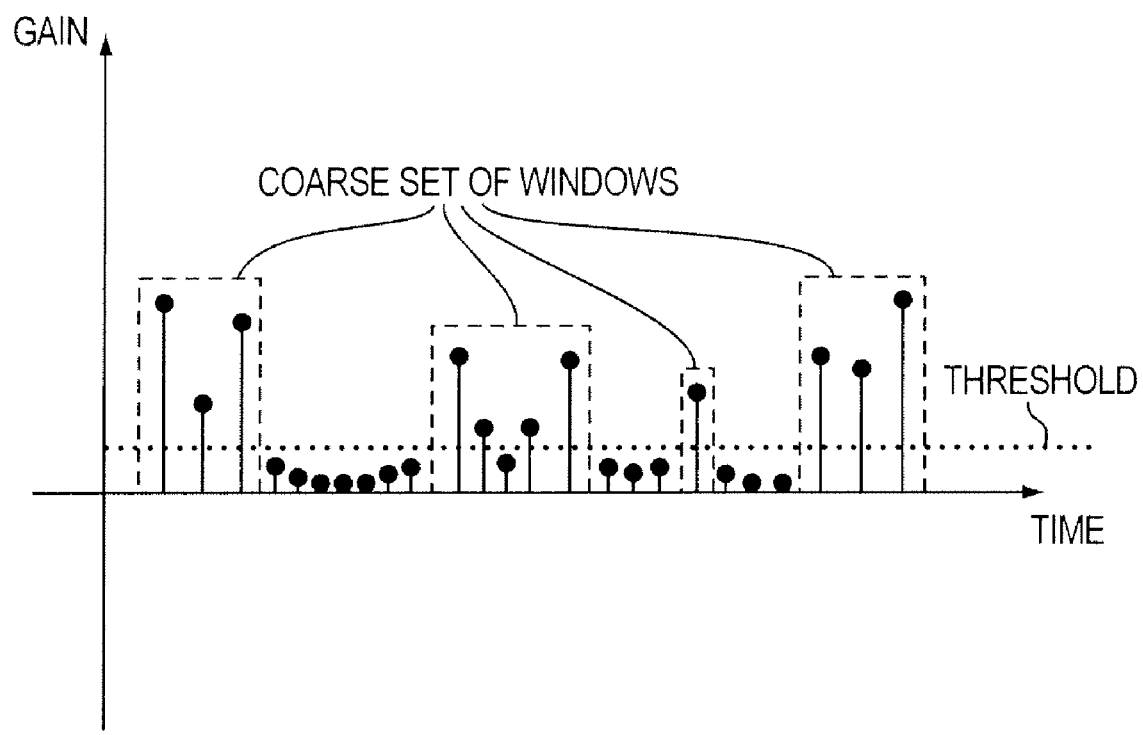
FIGS. 8A and 8B depict, respectively, a coarse set of windows and a fine set of windows for a channel impulse-response vector.

The identification information of the non-zero values at least equal to a threshold and the channel impulse-response (CIR) vector are presented at the input of the window module 704. The window module 704 defines a coarse set of windows covering the identified non-zero values, as depicted in FIG. 8A. In one embodiment, the windows in the coarse set of windows are non-overlapping and each window includes at least one identified non-zero value. The window module 704 provides the CIR vector and the coarse set of windows to the movement module 706 and the null module 708. Further details regarding windows formed over a channel-impulse response vector for equalization are set forth in U.S. patent application Ser. No. 11/978,841, filed on Oct. 30, 2007, which is a continuation-in-part of U.S. patent application Ser. No. 11/789,180, filed on Apr. 24, 2007, which claims priority under 35 U.S.C. §119 from U.S. Provisional Patent Application Ser. No. 60/852,607, filed on Oct. 18, 2006. The contents of all of these applications are hereby incorporated by reference in their entireties.

Figure 8B:
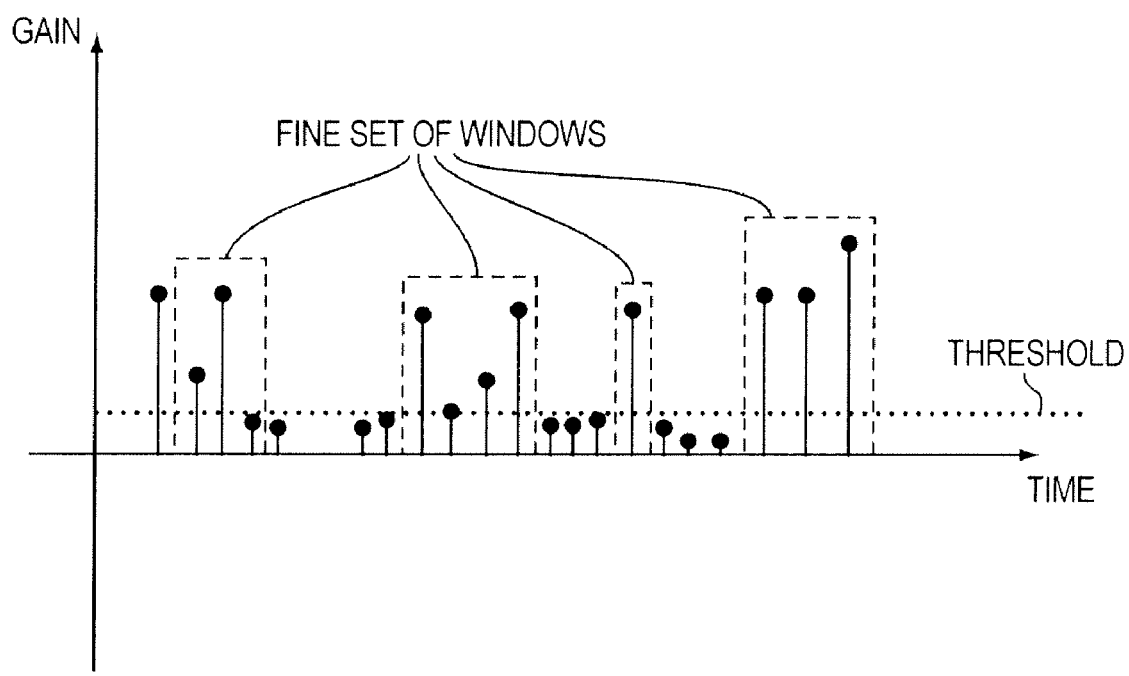

In one embodiment, the movement module 706 defines a fine set of windows which includes the coarse set windows, at least one of which is shifted in position by a predetermined range. For example, FIG. 8B shows an example of the fine set of windows, which correspond to the coarse set of windows shown in FIG. 8A with the coarse window shifted by one position. The movement module 706, by generating a fine set of windows, may help capture channel taps which are very close to but less than a threshold, and therefore are excluded from being identified as a non-zero value of interest in the threshold module 702. The fine set of windows, like the coarse set of windows, may be non-overlapping and each fine set window includes at least one identified non-zero CIR value. The predetermined range may be an integer value equal to or greater than one. In one embodiment, the fine set of windows is generated by altering the size of a window of the coarse set of windows. The window size may be altered in addition to moving the same or some other window of the coarse window set. In another embodiment, the movement module generates a third, fourth, fifth, and so on sets of windows, each including a different alteration done to the coarse set of windows.

Figure 9A:
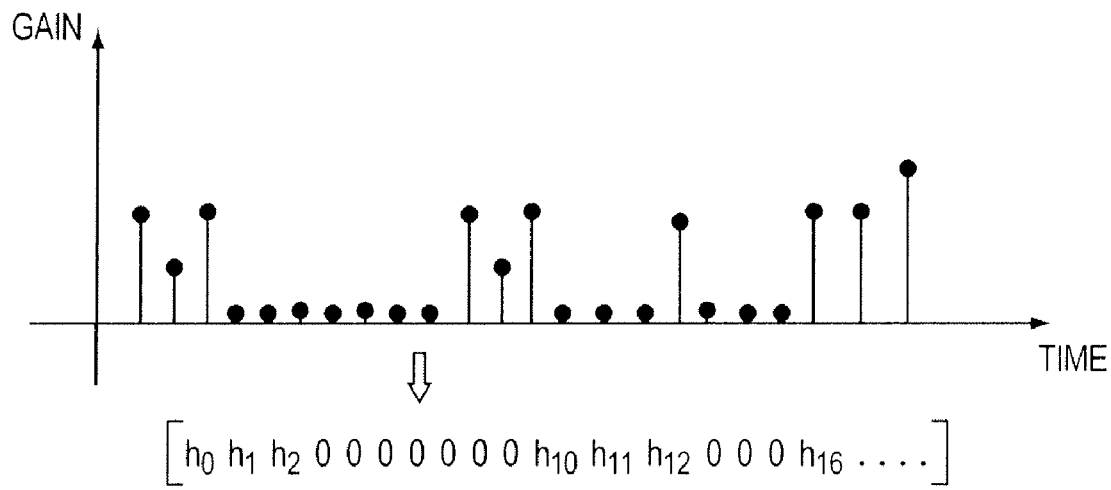
FIGS. 9A and 9B depict, respectively, a coarse window vector and a fine window vector obtained from the coarse and fine sets of windows depicted in FIGS. 8A and 8B.
Figure 9B:
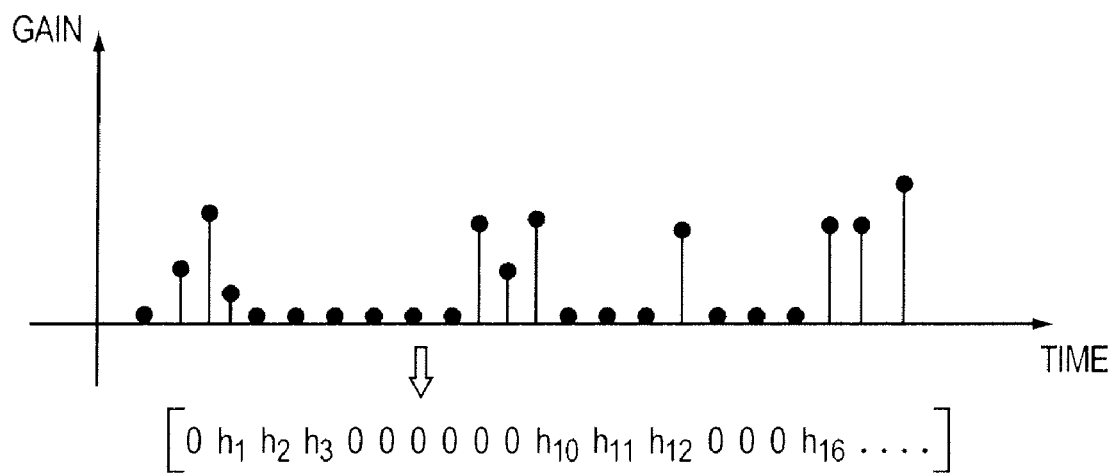

Apart from receiving the CIR vector and the coarse set of windows from the window module 704, the null module 708 also receives the fine set of windows from the movement module 706. The null module 708 equates values in the CIR vector outside the coarse window set to zero to obtain a coarse window vector, and equates values in the CIR vector outside the fine window set to zero to obtain a fine window vector. These nulling operations eliminate the noise taps in the CIR vector to provide "clean" coarse and fine window vectors each including estimated channel taps and zeros. FIGS. 9A, 9B show a coarse and fine window vectors, respectively, obtained for the coarse and fine window sets.

As shown in FIG. 7, the coarse window vector and the fine window vector are fed to the transform module 710, which transforms those vectors from the time domain to the frequency domain to generate coarse and fine mask vectors each including frequency-response values $H_0$, $H_1$, $H_2$, $H_3$, ..., $H_{N-1}$, where N is the number of sub-carriers in the received OFDM symbol. In one embodiment, the transform module 710 is or includes a Fourier-transform module 714 to perform Fourier transform (typically, FFT) on the coarse and fine window vectors.

With renewed reference to FIG. 4, the coefficient module 418 at its inputs receives the coarse and fine mask vectors from the channel-processing module 416, and the channel noise level from the noise-estimation module 414. Using the channel noise level, the coefficient module 418 calculates a coarse equalization coefficient vector based on the coarse mask vector and a fine equalization coefficient based on the fine mask vector. In one embodiment, the coefficient values of the coarse and fine equalization coefficient vectors are calculated as the inverse of the values of the coarse and fine mask vectors, respectively. For example, if the coarse and fine mask vectors each include values $H_0$, $H_1$, $H_2$, $H_3$, ..., $H_{N-1}$, the coarse and fine coefficient vectors will each include $1/H_0$, $1/H_1$, $1/H_2$, $1/H_3$, ..., $1/H_{N-1}$.

The equalization coefficient vectors from the module 418 and the Fourier-transformed OFDM symbol from the module 406 may be supplied to the equalization module 420. The equalization module 420 performs equalization by multiplying data $S_k$ of each sub-carrier k of the OFDM symbol with an equalization coefficient $1/H_k$. The equalized data $E_k$ obtained after such equalization may be provided to a slicer to match the equalized data to a predefined grid of levels. The predefined grid, in turn, represents the symbol values generated after the sub-carrier modulation at the transmitter. Equalization of the Fourier-transformed OFDM symbol using the coarse and fine coefficient vectors generates coarse and fine equalized data vectors, which are supplied to the selection module 422. The selection module 422 also receives the coarse and fine equalization coefficient vectors from the coefficient module 418, and selects one of those vectors based on a selection criterion. In one embodiment, the selection criterion corresponds to which of a coarse difference and a fine difference is smaller. The coarse difference may be calculated as the mean square error between the actual OFDM data $a_k$ and the equalized data $E_k$ of the coarse equalized data vector, where k=0, 1, 2, 3, ..., N−1. Similarly, the fine difference may be calculated as the mean square error between the actual OFDM data $a_k$ and the equalized data $E_k$ of the fine equalized data vector, where k=0, 1, 2, 3, ..., N−1. Accordingly, the selection module 422 selects the equalization coefficient vector which corresponds to the lesser of the two mean square error values. In one embodiment, the selected coefficient vector is used to equalize a fixed number of OFDM symbols of the received OFDM symbol stream before being generated again, where the fixed number depends on the mobility and location terrain of the transmitter and receiver.

The invention can be embodied in other specific forms without departing from the spirit or essential characteristics thereof. The foregoing embodiments are therefore to be considered in all respects illustrative rather than limiting on the invention described herein.

What is claimed is:

1. A system for determining equalization coefficients for an OFDM symbol stream, the system comprising:
   a channel-processing module for processing a channel impulse-response vector to obtain coarse and fine mask vectors, the channel-processing module comprising:
   (i) a threshold module for identifying non-zero values in the channel impulse-response vector that are greater than or equal to a predetermined threshold,
   (ii) a window module for defining a coarse set of non-overlapping windows covering the identified non-zero values in the channel impulse-response vector, wherein each window includes at least one identified non-zero value, and
   (iii) a movement module for moving a coarse set window within a predetermined range to obtain a fine set of non-overlapping windows;
   a coefficient module for calculating a coarse equalization coefficient vector based on the coarse mask vector and a line equalization coefficient vector based on the fine mask vector; and
   a selection module for selecting one of the equalization coefficient vectors based on a selection criterion.

2. The system of claim 1, wherein the channel-processing module further comprises:
   a null module for equating to zero values in the channel impulse-response vector which are not in the coarse window set in order to obtain a coarse window vector, and equating to zero values in the channel impulse-response vector which are not in the fine window set to obtain a fine window vector.

3. The system of claim 2, wherein the channel-processing module further comprises:
   a transform module for transforming the coarse window vector and the fine window vector to obtain, respectively, the coarse mask vector and the fine mask vector.

4. The system of claim 3, wherein the transform module comprises:
   a Fourier-transform module for performing a Fourier transform on the coarse and fine window vectors.

5. A system for determining equalization coefficients for an OFDM symbol stream, the system comprising:
- a channel-processing module for processing a channel impulse-response vector to obtain coarse and fine mask vectors;
- a coefficient module for calculating a coarse equalization coefficient vector based on the coarse mask vector and a fine equalization coefficient vector based on the fine mask vector;
- a selection module for selecting one of the equalization coefficient vectors based on a selection criterion; and
- an equalization module for performing equalization on an OFDM symbol using the coarse and fine equalization coefficient vectors to obtain coarse and fine equalized data vectors,
- wherein the selection criterion is which of a coarse difference and a fine difference is smaller, the coarse difference being the difference between the coarse equalized data vector and an actual data vector of the OFDM symbol, and the fine difference being the difference between the fine equalized data vector and the actual data vector.

6. The system of claim 5, wherein at least one of the coarse difference and the fine difference is calculated as mean square error (MSE).

7. A method for determining equalization coefficients for an OFDM symbol stream, the method comprising:
- processing a channel impulse-response vector to obtain coarse and fine mask vectors, the processing step comprising:
  - (i) identifying non-zero values in the channel impulse-response vector which are at least equal to a predetermined threshold,
  - (ii) defining a coarse set of non-overlapping windows covering the identified non-zero values in the channel impulse-response vector, wherein each window includes at least one identified non-zero value, and
  - (iii) moving a coarse set window within a predetermined range to obtain a fine set of non-overlapping windows;
- calculating a coarse equalization coefficient vector based on the coarse mask vector and a fine equalization coefficient vector based on the fine mask vector; and
- selecting one of the equalization coefficient vectors based on a selection criterion.

8. The method of claim 7, wherein the processing step further comprises:
- equating to zero values in the channel impulse-response vector which are not in the coarse window set to obtain a coarse window vector, and equating to zero values in the channel impulse-response vector which are not in the fine window set to obtain a fine window vector.

9. The method of claim 8, wherein the processing step further comprises:
- transforming the coarse window vector and the fine window vector to obtain, respectively, the coarse mask vector and the fine mask vector.

10. The method of claim 9, wherein the transforming step comprises:
- performing Fourier transform on the coarse and fine window vectors.

11. A method for determining equalization coefficients for an OFDM symbol stream, the method comprising:
- processing a channel impulse-response vector to obtain coarse and fine mask vectors;
- calculating a coarse equalization coefficient vector based on the coarse mask vector and a fine equalization coefficient vector based on the fine mask vector;
- selecting one of the equalization coefficient vectors based on a selection criterion; and
- performing equalization on an OFDM symbol using the coarse and fine equalization coefficient vectors to obtain coarse and fine equalized data vectors,
- wherein the processing step comprises identifying non-zero values in the channel impulse-response vector which are at least equal to a predetermined threshold and the selection criterion is which of a coarse difference and a fine difference is smaller, the coarse difference being the difference between the coarse equalized data vector and an actual data vector of the OFDM symbol, and the fine difference being the difference between the fine equalized data vector and the actual data vector.

12. The method, of claim 11, wherein at least one of the coarse difference and the fine difference is calculated as mean square error (MSE).

* * * * *

UNITED STATES PATENT AND TRADEMARK OFFICE
CERTIFICATE OF CORRECTION

| | | |
|---|---|---|
| PATENT NO. | : 8,325,790 B2 | Page 1 of 1 |
| APPLICATION NO. | : 12/534359 | |
| DATED | : December 4, 2012 | |
| INVENTOR(S) | : Haim Primo et al. | |

It is certified that error appears in the above-identified patent and that said Letters Patent is hereby corrected as shown below:

\*\*In the Claims:

At column 8, claim number 1, line number 47, delete "line" and replace with --fine--.\*\*

Signed and Sealed this
Sixteenth Day of April, 2013

Teresa Stanek Rea
*Acting Director of the United States Patent and Trademark Office*